(12) United States Patent
Allam et al.

(10) Patent No.: US 11,795,521 B2
(45) Date of Patent: Oct. 24, 2023

(54) EXTRACTION OF IRON (III) OXIDE FROM DIFFERENT IRON-CONTAINING ORES

(71) Applicant: The American University in Cairo, New York, NY (US)

(72) Inventors: Nageh K. Allam, New Cairo (EG); Mahmoud M. Aly, Maadi (EG)

(73) Assignee: The American University in Cairo, New York, NY (US)

( * ) Notice: Subject to any disclaimer, the term of this patent is extended or adjusted under 35 U.S.C. 154(b) by 993 days.

(21) Appl. No.: 16/615,205

(22) PCT Filed: May 22, 2018

(86) PCT No.: PCT/US2018/033876
§ 371 (c)(1),
(2) Date: Nov. 20, 2019

(87) PCT Pub. No.: WO2018/217739
PCT Pub. Date: Nov. 29, 2018

(65) Prior Publication Data
US 2020/0157653 A1    May 21, 2020

Related U.S. Application Data

(60) Provisional application No. 62/509,432, filed on May 22, 2017.

(51) Int. Cl.
*C22B 3/00* (2006.01)
*C22B 3/10* (2006.01)
*C01G 49/06* (2006.01)
*C22B 1/14* (2006.01)

(52) U.S. Cl.
CPC ............... *C22B 3/10* (2013.01); *C01G 49/06* (2013.01); *C22B 1/14* (2013.01)

(58) Field of Classification Search
CPC .. C01G 49/06; C22B 3/10; C22B 1/00; C22B 1/14
USPC ...................................... 423/150.3
See application file for complete search history.

(56) References Cited

U.S. PATENT DOCUMENTS 7,604,793 B2 * 10/2009 Koningen ............ C01G 49/06
423/633

* cited by examiner

*Primary Examiner* — Steven J Bos
(74) *Attorney, Agent, or Firm* — Lumen Patent Firm

(57) ABSTRACT

A method of extraction of pure iron (III) oxide from bulk iron ore is provided that includes crushing and grinding, using a crushing machine, raw hematite ore, where a milled ore is formed, water-washing the milled ore by rinsing under continuous stirring conditions, dilute acid-washing the milled ore with diluted hydrochloric acid under continuous stirring conditions, immersing the dilute acid-washed milled ore in concentrated acid under the continuous stirring conditions, and applying heat, treating the heated and immersed milled ore with an alkali to form a precipitate, washing with water the precipitate to purify the precipitate, and drying the purified precipitate, and igniting the purified dry precipitate to extract a pure iron (III) oxide from a bulk iron ore.

7 Claims, 9 Drawing Sheets

| Stage | Description |
|---|---|
| 1st stage | • Crushing and grinding of raw hematite ore. |
| 2nd stage | • Washing with water. |
| 3rd stage | • Washing with diluted acid. |
| 4th stage | • Immersion in concentrated acid with heat and stirring. |
| 5th stage | • Treatment with alkali to form corresponding precipitate. |
| 6th stage | • purification of precipitate by washing with water then drying. |
| 7th stage | • Ignition of precipitated portion. |

*FIG. 13*

EXTRACTION OF IRON (III) OXIDE FROM DIFFERENT IRON-CONTAINING ORES

CROSS-REFERENCE TO RELATED APPLICATIONS

This application is a 371 of PCT/US2018/033876 filed May 22, 2018. PCT/US2018/033876 claims the benefit of U.S. Provisional Application 62/509,432 filed May 22, 2017.

FIELD OF THE INVENTION

The present invention relates generally to production of iron (III) oxide. More particularly, the invention relates to production of iron (III) oxide via recovery, purification, extraction, separation and/or isolation from various iron-containing ores.

BACKGROUND OF THE INVENTION

Several well-known forms of iron oxides are provided naturally in essential ores such as magnetite, hematite, goethite, limonite, siderite, . . . etc. Iron (III) oxide has received and still receiving much attention, not only on the industrial level but on all known economic and strategic levels, since it is mainly applied in the iron and steel manufacture. Moreover, it is considered as one of the most important materials utilized in other industries such as ceramics, glass, paints, rubber, plastic, paper and building materials industries, and more.

Accordingly, many scientists and manufacturers are interested in the development of methods for processing and purification of various iron oxide ores (e.g. hematite and goethite) from the associated natural impurities.

Further, manufacturers have produced iron (III) oxide by different methods, among of them for example, production of iron oxide from iron sulfate with formation of ammonium sulfate and ammonium chloride as by-products. Process for the recovery of iron as hematite and other metallic values from a sulphate leach solution or from a solution of $Fe_2(SO_4)_3$/urea mixture containing nickel and cobalt sulphates. Treatment of hematite by oxidation/reduction methods has been studied.

Production of iron oxide from iron chloride solutions was reported and possibility of preparing hematite in different sizes and forms was achieved by others.

However, many manufacturers produced iron oxide using different methods under special conditions of pressure and temperature. In addition, concerns were raised with the production of alumina via the extraction of aluminum from aluminum containing materials including of related processes for treating industrial waste materials, such as red mud and fly ash via leaching with HCl so as to obtain a leachate comprising aluminum ions and a solid then separating the solid from the leachate. These processes can be effective for extracting various materials from red mud and fly ash.

Other methods have been reported for recovering iron as hematite from a sulfide ore or concentrate as from ferric chloride solutions containing a background chloride, preferably magnesium chloride, comprising heating the solution and adding water or steam to cause the precipitation of hematite and recovery of HCl. The processes also relate to the simultaneous oxidation and precipitation of ferrous iron as hematite, and to the recovery and recycling the associated acid within the process.

In other methods, utilization of iron oxide (hematite form) in the size of micro- or nano-scale is used in various fields of advanced applications.

What is needed is a method of purification and extraction of iron (III) oxide from hematite and goethite ores.

SUMMARY OF THE INVENTION

To address the needs in the art, a method of extraction of pure iron (III) oxide from bulk iron ore is provided that includes crushing and grinding, using a crushing machine, raw hematite ore, where a milled ore is formed, water-washing the milled ore by rinsing under continuous stirring conditions, dilute acid-washing the milled ore with diluted hydrochloric acid under continuous stirring conditions, immersing the dilute acid-washed milled ore in concentrated acid under the continuous stirring conditions, and applying heat, treating the heated and immersed milled ore with an alkali to form a precipitate, washing with water the precipitate to purify the precipitate, and drying the purified precipitate, and igniting the purified dry precipitate to extract a pure iron (III) oxide from a bulk iron ore.

According to one aspect of the invention, the cold and/or hot water-washing dissolves water soluble constituents in the milled ore and converts any oxide species to hydroxide forms of the oxide species, where the oxide species can include CaO, MgO, $Na_2O$, $K_2O$, SrO, or BaO.

In another aspect of the invention, the dilute acid-washing includes an acid with a concentration in range of 0.3 N to 3 N.

In a further aspect of the invention, the dilute acid-washing is replaced by using a leachate, where soluble salts are produced and utilized.

In one aspect of the invention, the concentrated acid includes concentrated hydrochloric acid, where the concentrated hydrochloric acid has a molar concentration in a range of 7N to 11.5 N.

According to another aspect of the invention, the concentrated acid immersion produces soluble ferric chloride, where the soluble ferric chloride is separated from insoluble constituents by filtering or suction.

In a further aspect of the invention, the precipitate is used for concentration of a ration of insoluble Nobel precious elements.

According to one aspect of the invention, the ignition is in a temperature range of 600-1200° C.

BRIEF DESCRIPTION OF THE DRAWINGS

FIG. 13 shows a flow diagram of the process of forming iron oxide, according to one embodiment of the current invention.

DETAILED DESCRIPTION

The current invention provides a reduced-complexity, and low-cost method to produce iron (III) oxide from its hematite and goethite ores, through systematic and sequential steps of grinding, acid treatment, washing, extraction and purification. Described herein are the main stations of the assigned stages have been followed by X-ray diffraction technique (XRD), (XRF), (TEM) and (EDX), which confirmed presence of iron (III) oxide in a pure form and high percentage yield. Accordingly, the method of the current invention can be considered safe, environment-friendly, easy applicable and having high economic feasibility for extraction of iron (III) oxide from its different iron-containing ores.

The current invention is directed to extraction of pure iron (III) oxide (hematite form) of chemical structure $Fe_2O_3$ from its contaminated hematite ores, not only this, but also the possibility of its extraction from various other iron ores through a simple series of successive, feasible and environmentally accepted steps of purification and extraction. These steps can be carried out on the industrial scale at the normal atmosphere (i.e. no need for applying external high pressures) and without using toxic materials (i.e. just using of hydrochloric acid, sodium hydroxide and/or ammonium hydroxide). However, the applied ores under study in this work are hematite and goethite.

Taking into account the importance of application and implementation of those steps and stages of purification and extraction in that way of sequence and arrangement (as described later).

First Stage (Crushing and Grinding):

This stage is implemented experimentally by cracking large pieces of ore using cut and hand-cracking tools and a good grinding of the ore can be obtained using a ball mill. On the other hand, the industrial-scale application of this stage can be directly obtained using electric crushing machines (crushers) where it is crushing and grinding together. However, the better the grinding, the better the other coming steps will be.

Figure 1:
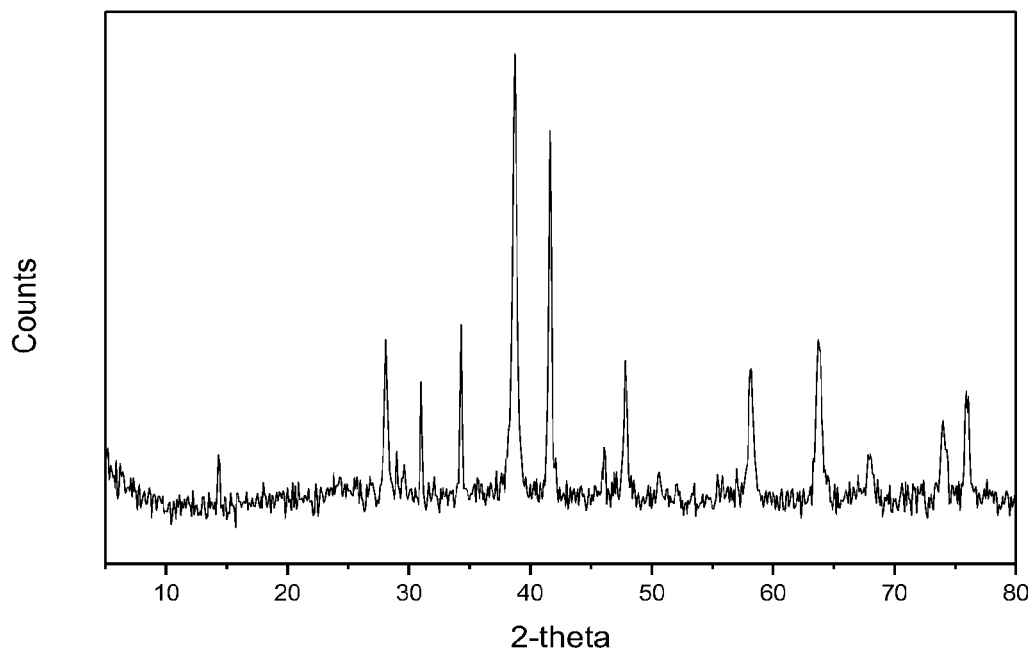
FIG. 1 shows an X-ray diffraction (XRD) pattern of hematite ore before purification and treatment, according to one embodiment of the current invention.
Figure 2:
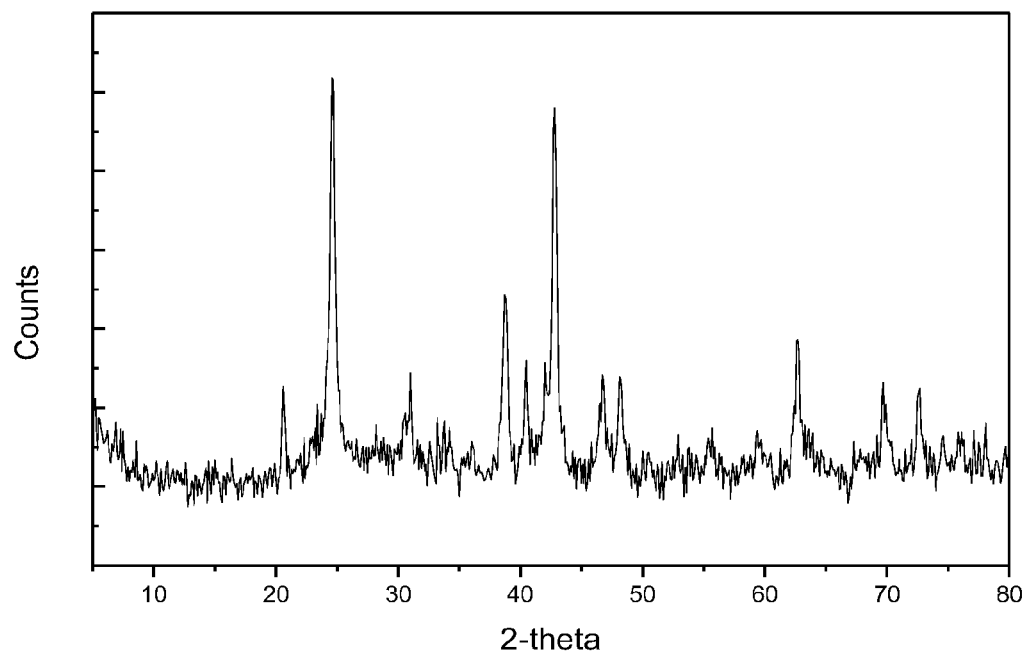
FIG. 2 shows and X-ray diffraction (XRD) pattern of goethite ore before purification and treatment, according to one embodiment of the current invention.

FIG. 1 and FIG. 2 show X-ray diffraction (XRD) of hematite and goethite ores respectively. As shown in Table 1, and Table 2 of X-ray fluorescence elemental analysis (XRF) of hematite and goethite ores, respectively.

TABLE 1

| XRF elemental analysis of hematite ore | |
|---|---|
| Constituents | (wt %) |
| $SiO_2$ | 6.77 |
| $TiO_2$ | 0.14 |
| $Al_2O_3$ | 3.26 |
| MnO | 0.07 |
| $Fe_2O_3^{tot.}$ | 75.04 |
| MgO | 0.53 |
| CaO | 5.26 |
| $Na_2O$ | 0.15 |
| $K_2O$ | 0.05 |
| $P_2O_5$ | 1.62 |
| $SO_3$ | 0.75 |
| Cl | 0.14 |
| LOI | 5.83 |
| $Y_2O_3$ | 0.014 |
| $As_2O_3$ | 0.003 |
| ZnO | 0.008 |
| NiO | 0.025 |
| CuO | 0.009 |
| SrO | 0.085 |
| PbO | 0.006 |
| BaO | 0.067 |
| $CO_3O_4$ | 0.126 |
| $V_2O_5$ | 0.036 |
| $ZrO_2$ | 0.024 |

TABLE 2

| XRF elemental analysis of goethite ore | |
|---|---|
| Constituents | (wt %) |
| $SiO_2$ | 14.50 |
| $TiO_2$ | 0.24 |
| $Al_2O_3$ | 2.99 |
| MnO | 0.06 |
| $Fe_2O_3^{tot.}$ | 64.87 |
| MgO | 0.38 |
| CaO | 0.97 |
| $Na_2O$ | 0.08 |
| $K_2O$ | 0.41 |
| $P_2O_5$ | 0.50 |
| $SO_3$ | 1.18 |
| Cl | 0.12 |
| LOI | 13.52 |
| ZnO | 0.043 |
| NiO | 0.013 |
| SrO | 0.003 |
| $CO_3O_4$ | 0.118 |
| $V_2O_5$ | 0.008 |
| $RbO_2$ | 0.003 |
| $ZrO_2$ | 0.006 |

Second Stage (Washing with Water):

The milled ore is washed with plain water and continuous stirring then filtering (separation) the washed portion.

Importance of this step contributes to dissolving any matters that can be soluble in water and also to convert some oxide species of some elements (such as CaO, MgO, $Na_2OH$, $K_2OH$ . . . ) to hydroxide forms which facilitate their separation (i.e. picking up) in the later step.

Third Stage (Treating with Diluted Acid):

The applied ore is immersed and washed with diluted hydrochloric acid with continuous stirring then it is filtered and washed.

The species of the elements (in the form of carbonates, hydoxides, and/or oxides) that can easily react with diluted hydrochloric acid will be converted into soluble chlorides within the liquor part which separated by filtration or decantation or pulled (sucked) from the surface. The species include:

CaO, MgO, Na$_2$O, K$_2$O... CaCO$_3$, MgCO3, Na$_2$O$_3$... + dil. HCl =====> (CA, Mg, Na, K... Chlorides) soluble species

Ca(OH)$_2$, Mg(OH)$_2$, NaOH...

M$_x$SO$_3$...

While other stable oxides (including iron oxide) are still insoluble and deposited in the bottom of container.

Optional Step A:

According to type of applied iron ores, it is possible to use the leachate of this third step wherein the produced soluble salts are utilized.

Figure 3:
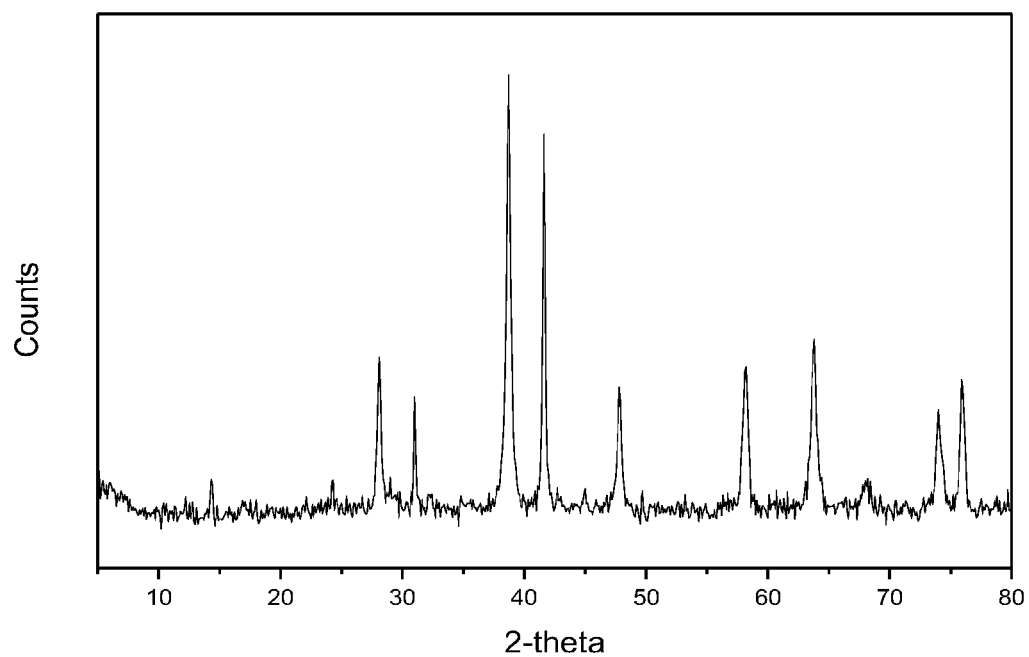
FIG. 3 shows an XRD of hematite ore residue after treatment with diluted hydrochloric acid (after third stage), according to one embodiment of the current invention.
Figure 4:
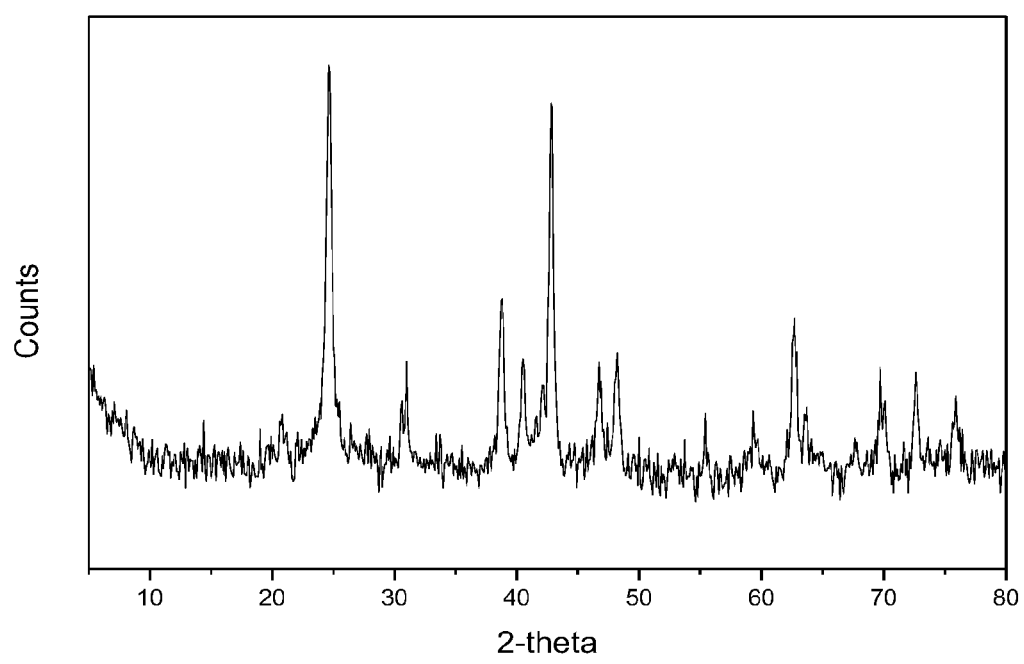
FIG. 4 shows an XRD of goethite ore residue after treatment with diluted hydrochloric acid (after third stage), according to one embodiment of the current invention.

FIG. 3 and FIG. 4 show XRD of hematite and goethite ore residues after treating with diluted hydrochloric acid respectively.

Figure 5:
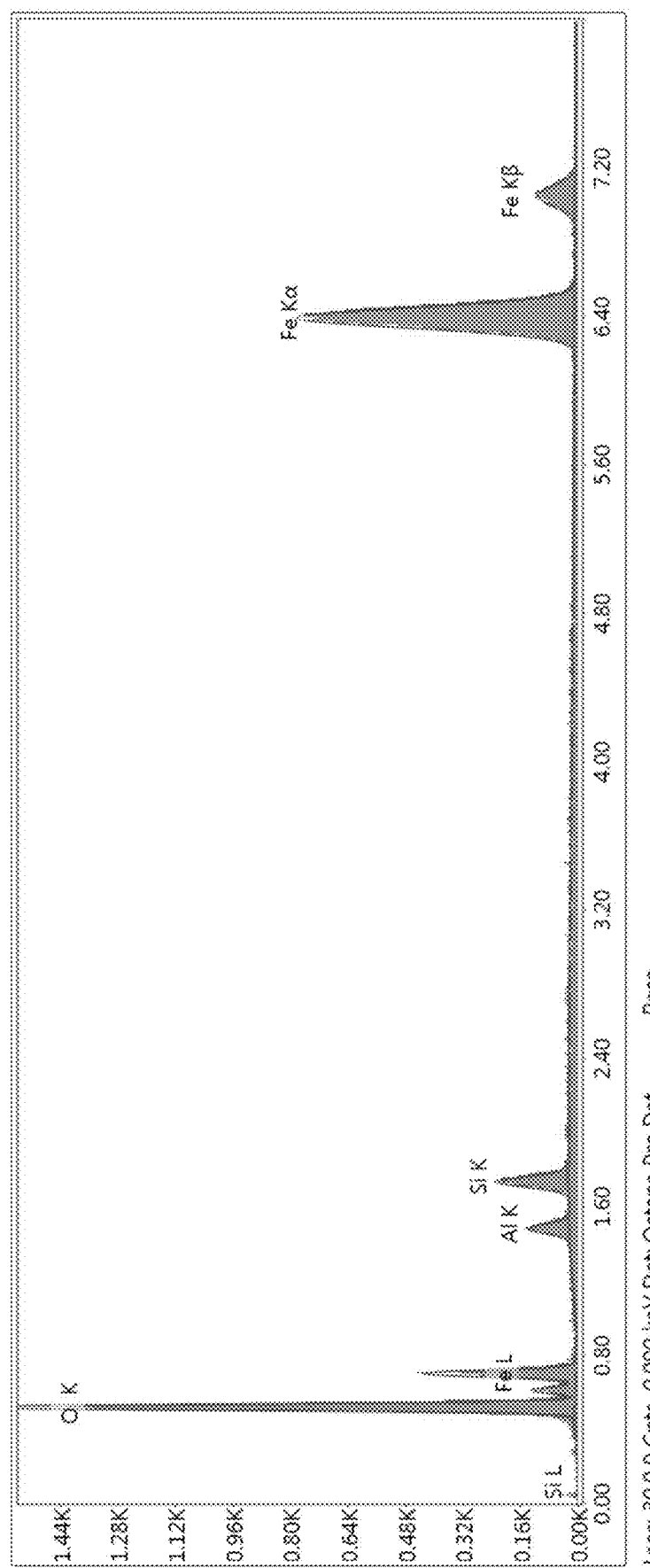
FIG. 5 shows an EDX chart of hematite ore residue after treatment with diluted hydrochloric acid (after third stage), according to one embodiment of the current invention.
Figure 6:
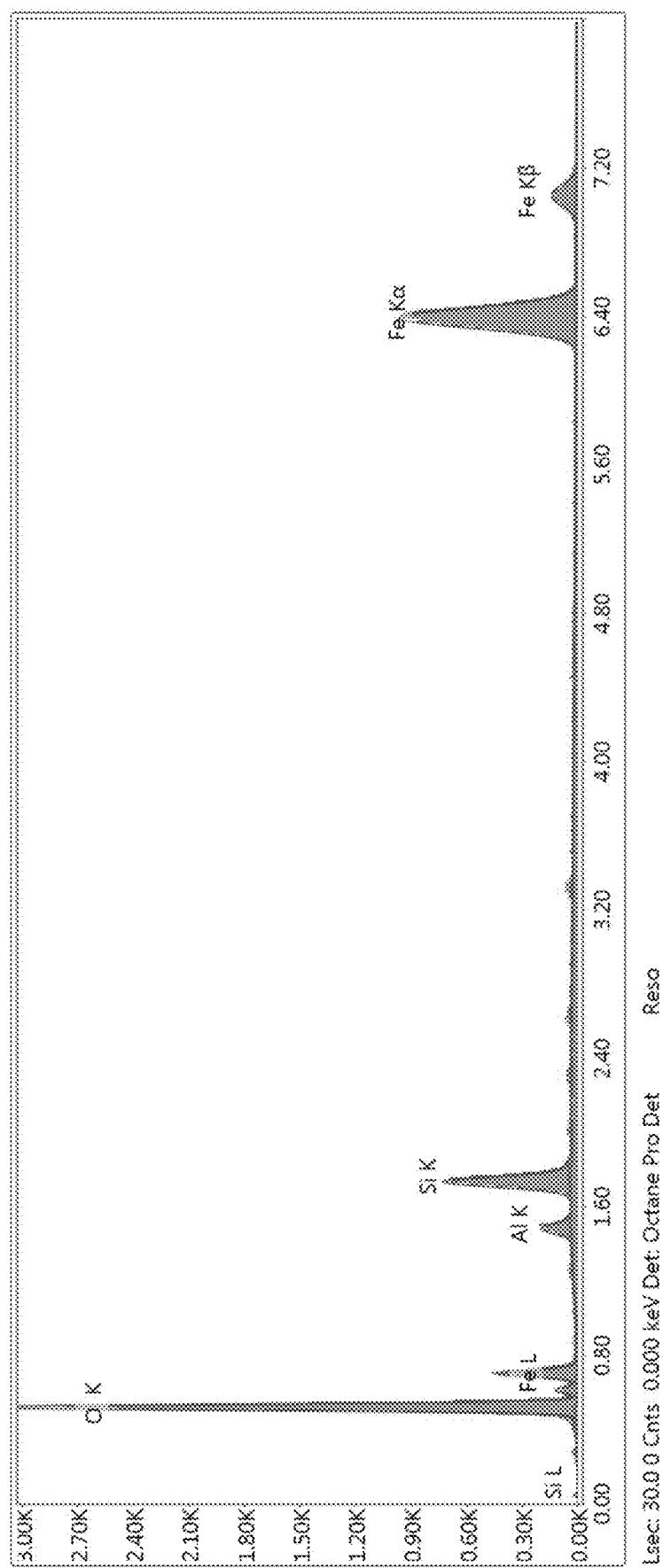
FIG. 6 shows an EDX chart of goethite ore residue after treatment with diluted hydrochloric acid (after third stage), according to one embodiment of the current invention.

FIG. 5 and FIG. 6 show EDX of hematite and goethite ore residues after treating with diluted hydrochloric acid respectively.

As shown in Table 3 and Table 4 show EDX of hematite and goethite ore residues after treating with diluted hydrochloric acid respectively.

TABLE 3

EDX of hematite ore residues after treating with diluted hydrochloric acid

| Element | Weight % | Atomic % | Net Int. | Error % |
|---|---|---|---|---|
| Al$_2$O$_3$ | 4.75 | 6.45 | 25.63 | 13.29 |
| SiO$_2$ | 7.67 | 17.66 | 47.5 | 11.01 |
| Fe$_2$O$_3$ | 87.58 | 75.89 | 352.66 | 2.58 |

TABLE 4

EDX of goethite ore residues after treating with diluted hydrochloric acid

| Element | Weight % | Atomic % | Net Int. | Error % |
|---|---|---|---|---|
| Al$_2$O$_3$ | 4.47 | 5.29 | 36.01 | 12.45 |
| SiO$_2$ | 18.01 | 36.15 | 164.32 | 7.64 |
| Fe$_2$O$_3$ | 77.52 | 58.56 | 438.41 | 2.48 |

Fourth Stage (Treating with Concentrated Acid):

This stage involves immersing of the treated ore in concentrated hydrochloric acid with a simple and continuous stirring and heating then filtering. In this step iron oxide will react with hot concentrated hydrochloric acid to produce highly soluble ferric chloride which can be easily separated by filtration or suction. Filtration is done at the industrial scale using the acid-resistant polymeric filters or suction by the acid-to resistant polymeric hose.

Fe$_2$O$_3$ insoluble+conc. HCl+heat=====>FeCl$_3$.6H$_2$O soluble

While other insoluble constituents (SiO$_2$, Al$_2$O$_3$, TiO$_2$...) are still insoluble and remain in the bottom of the container.

Optional Step B:

According to type of applied iron ores, it is possible to utilize the produced precipitate of the fourth step for concentration of the ratio of insoluble Nobel precious elements if present.

Fifth stage: This involves separation of the filtrate (located in the concentrated acid solution and containing ferric chloride solution) and treatment with a solution of a suitable alkali such as sodium hydroxide or ammonia solution (ammonium hydroxide), which leads to formation of profusely sediments of iron hydroxide (ferric hydroxide) which deposits at the bottom.

FeCl$_3$.6H$_2$O soluble+NaOH=====>Fe(OH)$_3$ insoluble+NaCl soluble or

FeCl$_3$.6H$_2$O soluble+NH$_4$OH===32 =>Fe(OH)$_3$insoluble+NH$_4$Cl soluble

Sixth stage: separation and assembling of the deposited portion of ferric hydroxide by filtration then wash it off with water and drying at temperatures of about 100-110 degree Celsius.

Optional Step C:

Ability of assembling the filtrate which contain sodium chloride or ammonium chloride and utilization of it as a byproduct. Moreover, regeneration of hydrochloric acid.

Seventh stage: burning of dried part of the formed precipitate of ferric hydroxide at high temperature (600-1200° C.) for short periods of times at normal atmosphere which leads to formation of ferric oxide in nanometric size with a high degree of purity.

Fe(OH)$_3$+heat (ignition)=====>Fe$_2$O$_3$

This stage can be done using furnaces which designed for industrial purposes, such as electric furnaces dedicated to the glass industry. It is worth mentioning that the color grade of resulting iron oxide can be controlled by applying different temperatures.

However, the last seventh stage of the above steps has been followed up and confirmed using X-ray diffraction XRD, Transmission electron microscope TEM and EDX techniques.

Figure 7:
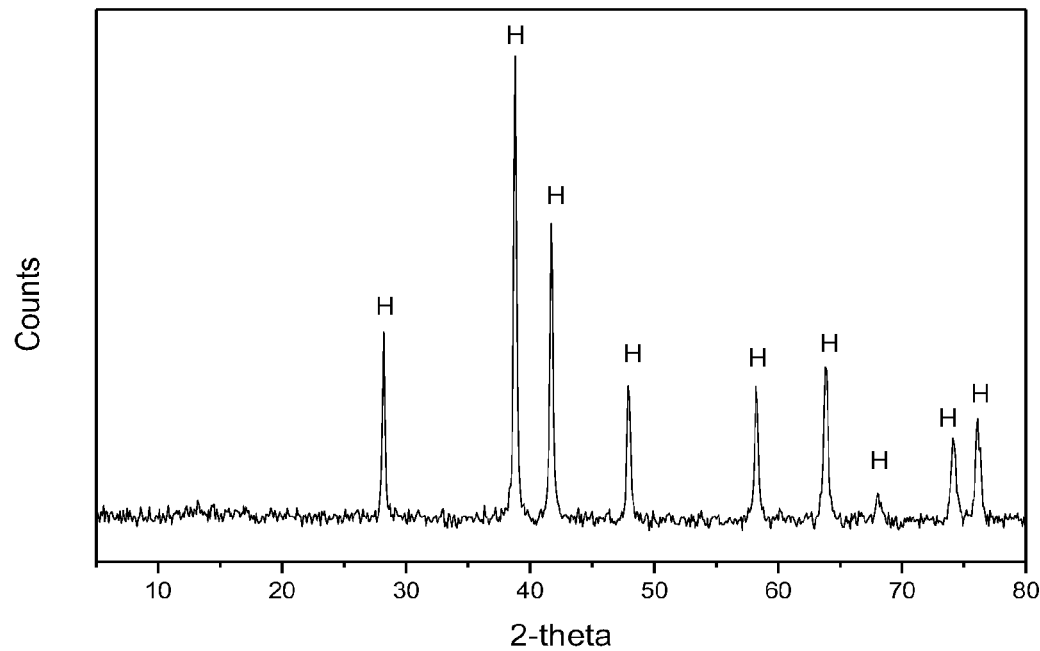
FIG. 7 shows an XRD of iron oxide resulting from hematite ore after treatment with concentrated hydrochloric acid and ignition (after seventh stage), according to one embodiment of the current invention.
Figure 8:
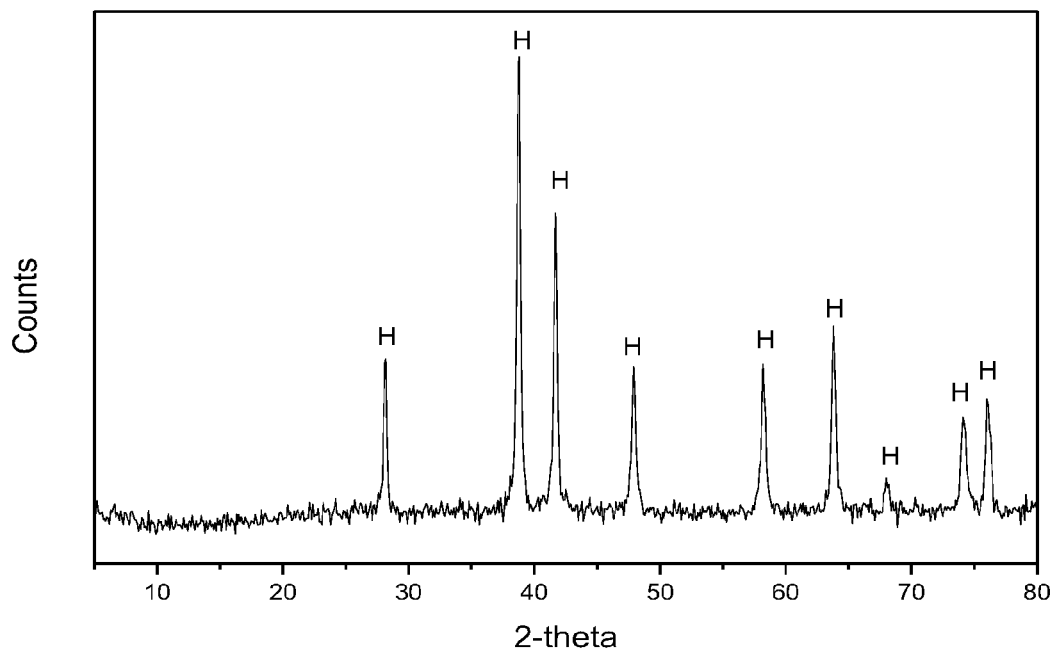
FIG. 8 shows an XRD of iron oxide resulting from goethite ore after treatment with concentrated hydrochloric acid and ignition (after seventh stage), according to one embodiment of the current invention.

FIG. 7 and FIG. 8 show XRD of resultant ferric oxide produced from hematite and goethite residues after treating with concentrated hydrochloric acid and ignition respectively. (show high purity)

Figure 9:
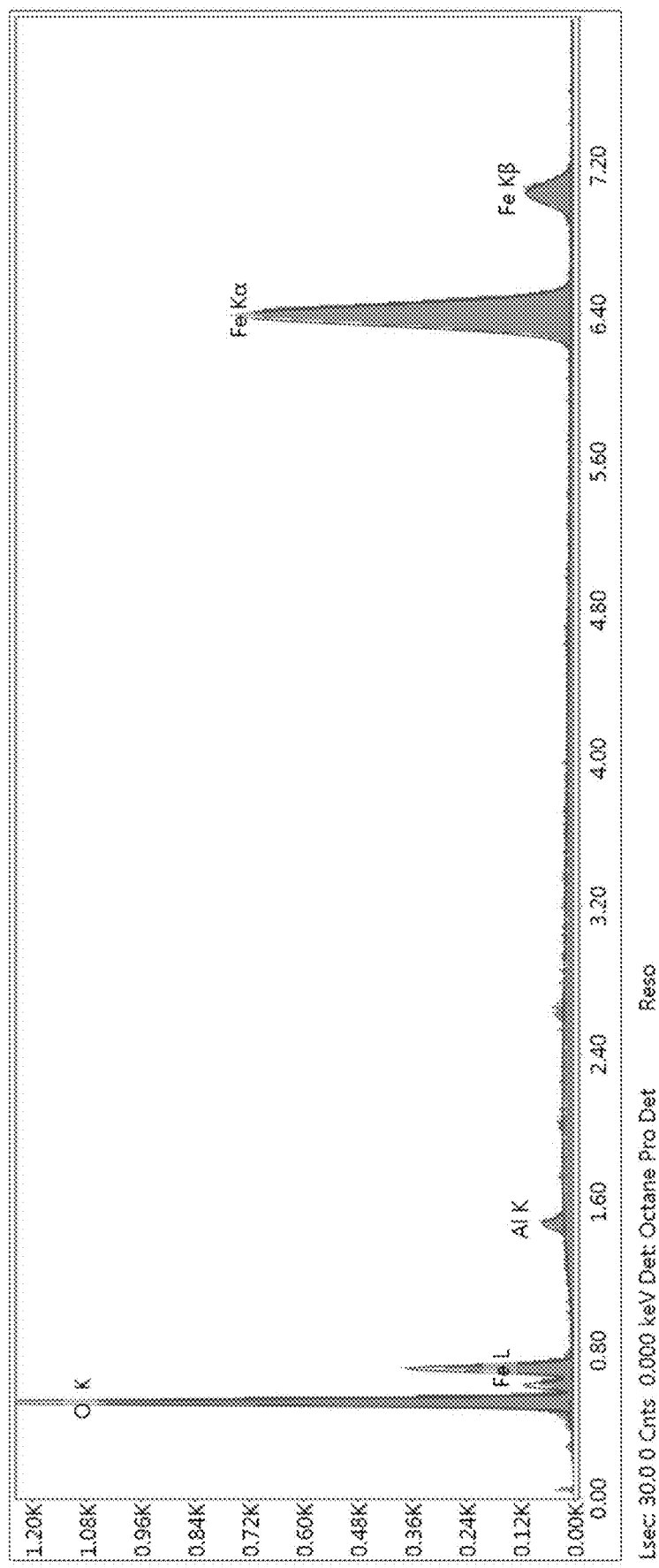
FIG. 9 shows an EDX of iron oxide resulting from hematite ore after treatment with concentrated hydrochloric acid and ignition (after seventh stage), according to one embodiment of the current invention.
Figure 10:
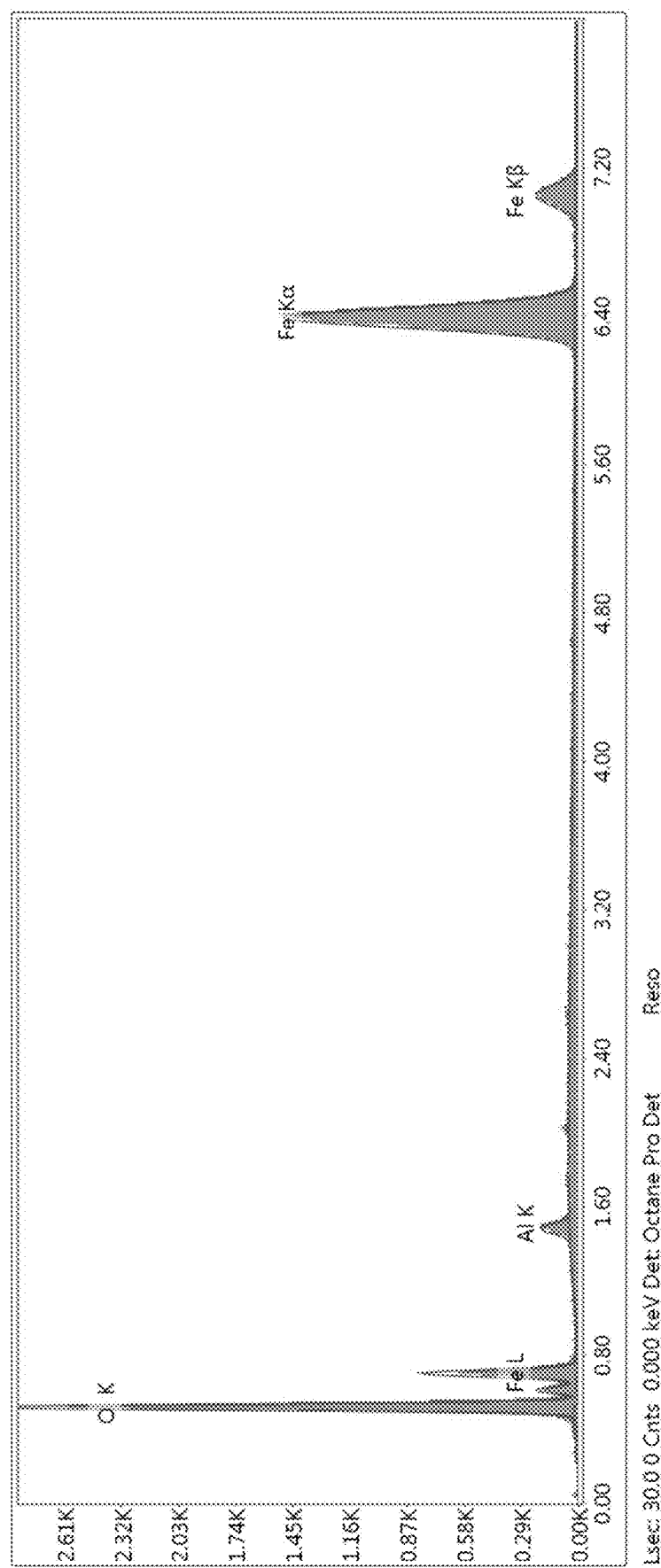
FIG. 10 shows an EDX of iron oxide resulting from goethite ore after treatment with concentrated hydrochloric acid and ignition (after seventh stage), according to one embodiment of the current invention.

FIG. 9 and FIG. 10 show EDX of resultant ferric oxide produced from hematite and goethite residues after treating with concentrated hydrochloric acid and ignition respectively. (show high purity)

Table 5, and Table 6 show EDX of resultant ferric oxide produced from hematite and goethite residues after treating with concentrated hydrochloric acid and ignition respectively. (show high purity)

TABLE 5

EDX of iron oxide produced from hematite ore after seventh stage

| Element | Weight % | Atomic % | Net Int. | Error % |
|---|---|---|---|---|
| Al$_2$O$_3$ | 2.41 | 3.72 | 10.48 | 20.68 |
| Fe$_2$O$_3$ | 97.59 | 96.28 | 336.24 | 2.61 |

TABLE 6

EDX of iron oxide produced from goethite ore after seventh stage

| Element | Weight % | Atomic % | Net Int. | Error % |
|---|---|---|---|---|
| $Al_2O_3$ | 3.84 | 5.88 | 34.19 | 13.06 |
| $Fe_2O_3$ | 96.16 | 94.12 | 672.95 | 2.26 |

FIG. 9 and FIG. 10 show it can be observed that very minute alumina is present with the (resultant) produced iron oxide, it may be come during the filtration process of fifth stage (i.e. escape of a portion of fine alumina through the mesh of filter paper at the laboratory scale). But industrially, it does not the matter, where the filtrate=leachate=liquor (liquid portion of fifth stage) can be sucked by the acid-resistant polymeric hose which inhibits the intersection of fine alumina.

On the other hand, the observed very minute alumina that is associated to the (resultant) produced iron oxide, it may be come due to decay of minute portion of alumina to aluminum chloride through the fourth stage. However, this challenge can be easily solved by adding excess sodium hydroxide within the fifth stage.

It is clear from Table 5, and Table 6 that percentage of escaping fine alumina after the seventh stage is high in case of iron oxide produced from goethite ore. This can be attributed to removal of high percentage of silica $SiO_2$ (18%) in case of goethite ore as recorded in Table 4.

Figure 11:
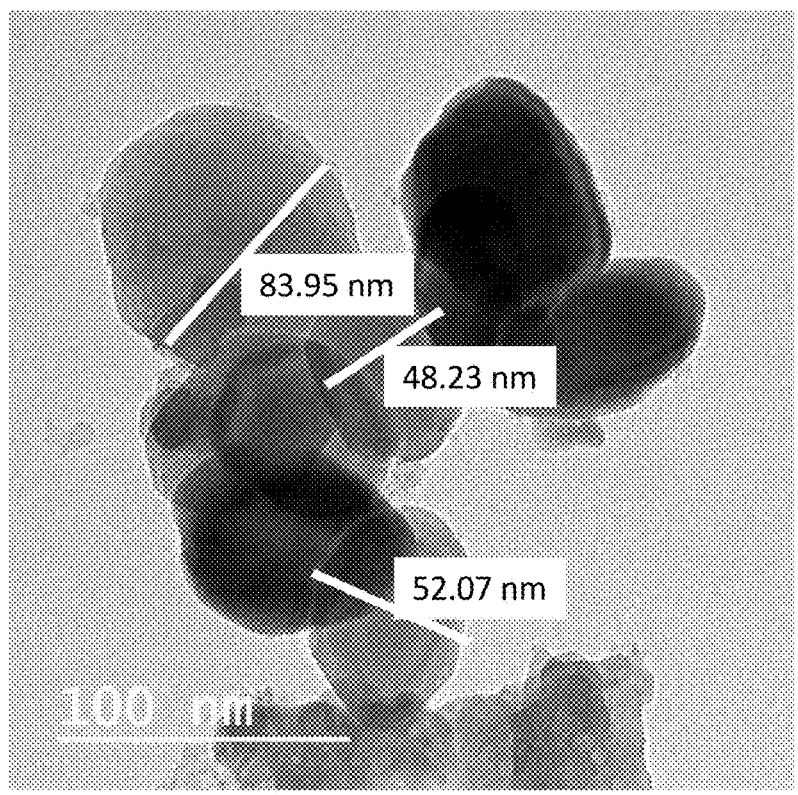
FIG. 11 shows an TEM of iron oxide (in nano size) resulting from hematite ore after treatment with concentrated hydrochloric acid and ignition (after seventh stage), according to one embodiment of the current invention.
Figure 12:
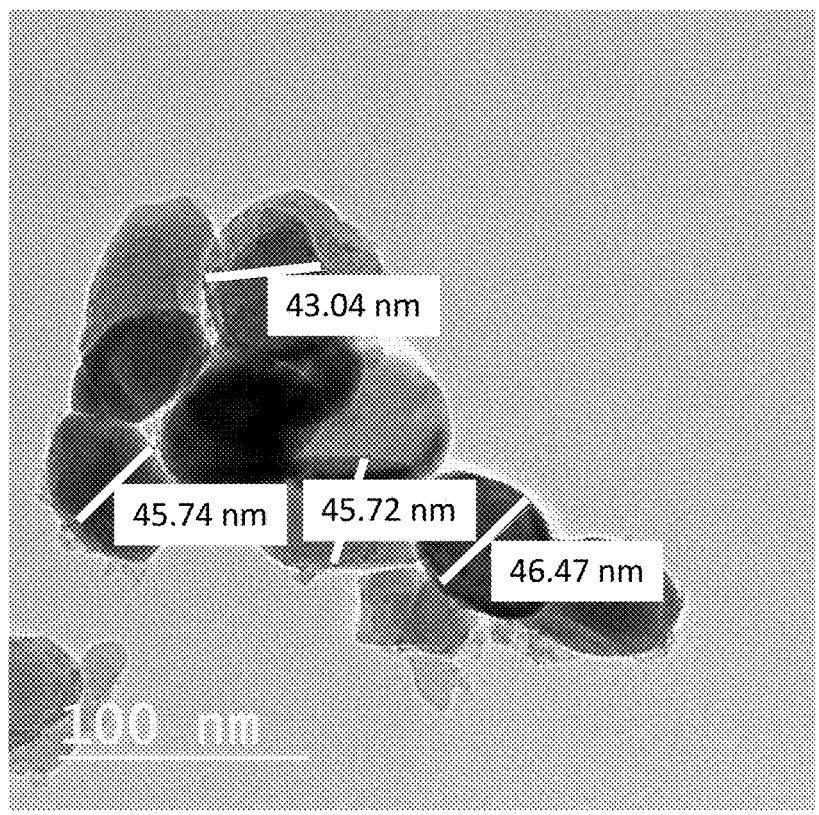
FIG. 12 shows an TEM of iron oxide (in nano size) resulting from goethite ore after treatment with concentrated hydrochloric acid and ignition (after seventh stage), according to one embodiment of the current invention.

In addition, it can be observed from FIG. 11 and FIG. 12 that formation of iron oxide in nanometric size with a high degree of purity.

As shown in the figures of TEM of resultant iron oxide produced from hematite and goethite residues after treating with concentrated hydrochloric acid and ignition respectively. (show nano-sized particles)

For example, magnetite-containing ores can undergo the separation by applying electrical magnet after crushing and grinding. For example, siderite-containing ores can decay easily by heating. Thus, siderite ores can undergo just only the necessary steps of the mentioned procedures of extraction and purification after sufficient heating to the applied ore.

FIG. 13 shows a flow diagram summarizing the above-mentioned steps, according to one embodiment of the current invention.

It is clear now after what has been disclosed above that thesesystematic steps are safe, environmentally acceptable, easy applicable and have high economic feasibility for extraction of iron oxide from its different ores.

According to one aspect of the invention, a system for the purification and extraction of iron oxide III from many raw materials of iron is provide that includes several mechanical and chemical stages that should be implemented in a manner of required relay and arrangement. These stages include stage 1. cracking and grinding of applied iron ore then stage 2. washing the grinded iron ore with water and then stage 3. wash with diluted acid and then stage 4. immersion the produced iron ore in hot concentrated hydrochloric acid and then, 5. a filtration stage and detach the filtered part then treating with appropriate alkaline solution to form precipitate and then stage 6. filtration and separation of the deposited part and washing with water then drying and finally, stage 7. burning of the dried portion of the deposit.

In one aspect, the sequence of the previous steps of the purification and treatment of iron oxide ores is very important for producing iron oxide (hematite) in a pure form.

The present invention has now been described in accordance with several exemplary embodiments, which are intended to be illustrative in all aspects, rather than restrictive. Thus, the present invention is capable of many variations in detailed implementation, which may be derived from the description contained herein by a person of ordinary skill in the art. For example, due to the importance of iron oxide and its major role in the development and manufacture of civilizations, it has major applications in many different industrial areas, including (but not limited):

1. Iron oxide entry is mainly in the manufacture of iron and steel, especially after purification and treatment, which makes it easy to get iron metal by reduction processes.

2. The possibility of using this approach to benefit from iron of Aswan in Egypt, which has a high percentage of impurities (or any other location has iron ore containing high percentage of impurities) that can be easily disposed of by these successive steps mentioned before.

3. It can be used as a major pigment in the manufacture of paints and primer paints that prevent corrosion of metals.

4. It can be used as a important pigment also in plastic, rubber and glass industries.

5. The possibility of extracting red iron oxide in nanometer form (in nanoscale size), so it can be used in medical applications, catalysis and other many advanced applications as needed, due to having high purity.

6. Not only that but also some of the materials produced as byproducts can be utilized during the implementation of the previous steps such as the use of the formation of side compounds such as ammonium chloride or sodium chloride formed when processing iron chloride.

7. Possibility of utilization the produced precipitate of this fourth step for concentration of the ratio of Nobel precious elements, if present.

All such variations are considered to be within the scope and spirit of the present invention as defined by the following claims and their legal equivalents.

What is claimed:

1. A method of extraction of pure iron (III) oxide from bulk iron ore, comprising:
    a) crushing and grinding, with a crushing machine, raw hematite ore, wherein a milled ore is formed;
    b) water-washing said milled ore comprising rinsing under continuous stirring conditions;
    c) dilute acid-washing said water-washed milled ore with diluted hydrochloric acid under said continuous stirring conditions;
    d) immersing said dilute acid-washed milled ore in concentrated acid under said continuous stirring conditions, and applying heat;
    e) treating said heated and immersed milled ore with an alkali to form a precipitate;
    f) washing with water said precipitate to purify said precipitate, and drying said purified precipitate; and
    g) igniting said purified dry precipitate to extract a pure iron (III) oxide from a bulk iron ore.

2. The method of claim 1, wherein said cold, hot, or, cold and hot water-washing dissolves water soluble constituents in said milled ore and converts any oxide species to hydroxide forms of said oxide species, wherein said oxide species is selected from the group consisting of CaO, MgO, $Na_2O$, $K_2O$, SrO and BaO.

3. The method of claim 1, wherein said dilute acid-washing comprises an acid with a concentration in range of 0.3 N to 3 N.

4. The method of claim 1, wherein said dilute acid-washing is replaced with a leachate, wherein soluble salts are produced.

5. The method of claim 1, wherein said concentrated acid comprises concentrated hydrochloric acid, wherein said concentrated hydrochloric acid has a molar concentration in a range of 7 N to 11.5 N.

6. The method of claim 1, wherein said concentrated acid immersion produces soluble ferric chloride, wherein said soluble ferric chloride is separated from insoluble constituents by filtering or suction.

7. The method of claim 1, wherein said ignition is in a temperature range of 600-1200° C.

* * * * *